US000001112H

United States Statutory Invention Registration [19]

[11] Reg. Number: H1112

Ezaki et al.

[43] Published: Nov. 3, 1992

[54] SILVER HALIDE COLOR PHOTOGRAPHIC LIGHT-SENSITIVE MATERIAL HAVING A WIDE LATITUDE

[75] Inventors: Atsuo Ezaki; Keisuke Tobita; Hiroshi Ikeda; Hideaki Haraga, all of Hino, Japan

[73] Assignee: Konica Corporation, Japan

[21] Appl. No.: 598,550

[22] Filed: Oct. 16, 1990

[30] Foreign Application Priority Data

Oct. 18, 1989 [JP] Japan ..... 1-272046
Oct. 18, 1989 [JP] Japan ..... 1-272048

[51] Int. Cl.[5] ..... G03C 1/46

[52] U.S. Cl. ..... 430/506; 430/383; 430/384; 430/386; 430/388; 430/391; 430/467; 430/470; 430/478; 430/543; 430/549; 430/357

[58] Field of Search ..... 430/357, 376, 383, 384, 430/386, 388, 391, 467, 470, 478, 506, 543, 549

[56] References Cited

U.S. PATENT DOCUMENTS

| | | | |
|---|---|---|---|
| 4,746,601 | 5/1988 | Mihayashi et al. | 430/543 |
| 4,780,399 | 10/1988 | Urata | 430/506 |
| 4,880,726 | 11/1989 | Shiba et al. | 430/383 |
| 4,946,767 | 8/1990 | Yamagami | 430/543 |
| 4,952,485 | 8/1990 | Shibahara et al. | 430/506 |

*Primary Examiner*—Robert L. Stoll
*Assistant Examiner*—Joseph D. Anthony
*Attorney, Agent, or Firm*—Bierman and Muserlian

[57] ABSTRACT

A silver halide color photographic light-sensitive material improved in graininess, comprising a support having thereon a red-sensitive silver halide emulsion layer, a green-sensitive silver halide emulsion layer and a blue-sensitive silver halide emulsion layer, wherein at least one of the red-sensitive emulsion layer and the green-sensitive emulsion layer has the three-layered structure, in which the low speed silver halide emulsion layer, medium speed silver halide emulsion layer and high speed silver halide emulsion layer are coated on the support in this order; and the coating amount of silver in the layer increases in the order of the medium speed layer, low speed layer and high speed layer.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE COLOR PHOTOGRAPHIC LIGHT-SENSITIVE MATERIAL HAVING A WIDE LATITUDE

FIELD OF THE INVENTION

The present invention relates to a silver halide color photographic light-sensitive material, more specifically to a silver halide color photographic light-sensitive material having a wide latitude in a high exposure portion and good aptitude for rapid processing, as well as an improved graininess and storage stability of the 3-layered silver halide emulsion layers.

BACKGROUND OF THE INVENTION

In recent years, a silver halide color photographic light-sensitive material (hereinafter referred to as a color light-sensitive material) is making marked progress in quality of images, and a multilayer structure has come to be used in each of the red-sensitive silver halide emulsion layer, green-sensitive silver halide emulsion layer and blue-sensitive silver halide emulsion layer for much higher image quality and much wider latitude. Such multilayer structure is particularly useful for the improvement of graininess.

Many techniques are known as a means to improve graininess of a color light-sensitive material. For example, British Patent No. 923,045 disclosed a technique to enhance sensitivity without impairing the graininess by distributing couplers of the same color to a high speed emulsion layer and and a low speed emulsion layer, and adjusting the maximum optical density of the high speed layer to a low level. But this technique is not enough to provide a good graininess.

One technique was proposed in Japanese Patent Examined Publication No. 15495/1974, where at least one of the red-sensitive silver halide emulsion layer, green-sensitive silver halide emulsion layer and blue-sensitive silver halide emulsion layer has a sensitivity which decreases in the order of the top layer, intermediate layer and bottom layer, besides maximum optical densities in the top and intermediate layers are set below 0.6. While this technique can noticeably improve the graininess in medium and high density portions, it is liable to cause a high fog density.

Another technique is described in Japanese Patent Open for Public Inspection No. 91945/1987; that is, in a light-sensitive material having at least one emulsion layer of a 3-layered structure consisting of a low speed silver halide emulsion layer, medium speed silver halide emulsion layer and high speed silver halide emulsion layer, setting the maximum optical density in said medium speed silver halide emulsion layer and low speed silver halide emulsion layer to 0.8 or more is proposed for improving the graininess of an insufficiently exposed portion. But this method cannot provide a good graininess in medium and high exposure portions of the green-sensitive silver halide emulsion layer.

Since the green-sensitive silver halide emulsion layer has the highest spectral luminous efficacy among these color-sensitive layers, quality of this layer is one of the key contributing factors to the property of the light-sensitive material. Particularly, deterioration in the graininess of this layer impairs the overall impression of a color image. Therefore, in forming a green-sensitive three-layered silver halide emulsion layer, distribution of silver halide to each of the high speed layer, medium speed layer and low speed layer is very important, and many of the attempts made till now were to use a larger amount of silver halide in high speed and medium speed layers and a less amount in a low speed layer. As a result, problems have come to arise in the graininess in a middle to highlight portion and the latitude in a high exposure portion, thereby it is difficult to obtain a fairly wide latitude by this method.

Moreover, such attempts were to solve overall problems of the graininess in a color light-sensitive material with three-layer structure of layers sensitive to the same color; therefore, it is difficult to attain a high quality image expressible fine texture of human skin by a color light-sensitive material having simply a red-sensitive three-layer structure. To attain this object, there are required much more techniques for proper distribution of silver amount to each of the high speed, medium speed and low speed emulsion layers; setting of an optimum grain size; addition of a coupler capable of forming a slightly-mobile dye, etc. But improvement in gradation of the medium and low speed emulsion layers inevitably increases the amount of a dye forming coupler used in these layers and thereby results in uneven graininess, losing capability of expressing delicacy of the skin texture.

Further, the distribution of silver to the medium speed layer (the medium layer) and the low speed layer (the lower layer) in a larger amount than that to the high speed emulsion layer (the upper layer) causes troubles such as silver retention in a red-sensitive layer in a rapid process because the red-sensitive layer is the closest to the support.

Taking notice of the above conditions, the present inventor has studied how to improve the graininess in both of the green-sensitive silver halide emulsion layer and the red-sensitive silver halide emulsion layer and found that an excellent graininess, a wide latitude in a high exposure portion of the green-sensitive layer, and an improved storage stability of the red-sensitive layer, as well as a good aptitude for rapid processing of the light-sensitive material can be attained by prescribing the order of arrangement of the high speed, medium speed and low speed emulsion layers in the three-layered structure and the amount of silver used in these emulsion layers.

SUMMARY OF THE INVENTION

A first object of the present invention is to provide a silver halide color photographic light-sensitive material excellent in graininess.

A second object of the present invention is to provide a silver halide color photographic light-sensitive material improved in graininess of the green-sensitive silver halide emulsion layer of three-layered structure.

A third object of the present invention is to provide a silver halide color photographic light-sensitive material improved in graininess of the red-sensitive layer and aptitude for rapid processing of the light-sensitive material as well as in storage stability.

In a silver halide color photographic light-sensitive material comprising a support bearing thereon a red-sensitive silver halide emulsion layer, green-sensitive silver halide emulsion layer and blue-sensitive silver halide emulsion layer, the foregoing objects have been attained by the silver halide color photographic light-sensitive material characterized in that one or both of the red-sensitive emulsion layer and green-sensitive layer have the three-layered structure in which the low speed silver halide emulsion layer, medium speed silver halide emulsion layer and high speed silver halide emulsion layer are coated on a support in this order and that the amount of silver used in at least one of said three-layer-structured layer of the red-sensitive and green-sensitive emulsion layer increases in the order of the medium speed layer, low speed layer and high speed layer.

DETAILED DESCRIPTION OF THE INVENTION

The present invention is hereunder described in more details.

The silver halide color photographic light-sensitive material of the invention has on a support the red-sensitive silver halide emulsion layer, green-sensitive silver halide emulsion layer and blue-sensitive silver halide emulsion layer, and at least one of these emulsion layers consists of the low speed silver halide emulsion layer, medium speed silver halide emulsion layer and high speed silver halide emulsion layer. Particularly, the green-sensitive layer consists at least of the low speed silver halide emulsion layer, medium speed silver halide emulsion layer and high speed silver halide emulsion layer, and the coating amount of silver of these emulsion layers increases in order of the medium speed silver halide emulsion layer, low speed silver halide emulsion layer, and high speed silver halide emulsion layer. With these features, the silver halide color photographic light-sensitive material of the invention can exhibit an excellent graininess and a wide latitude in a high exposure portion.

In the silver halide color photographic light-sensitive material of the invention, the green-sensitive silver halide emulsion layer and red-sensitive silver halide emulsion layer are preferably of three-layered structure in which the low speed layer, medium speed layer and high speed layer are coated on a support in this sequence.

Further, in the silver halide color photographic light-sensitive material of the invention, the blue-sensitive silver halide emulsion layer, green-sensitive silver halide emulsion layer and red-sensitive silver halide emulsion layer are of three-layered structure in which the low speed layer, medium speed layer and high speed layer are coated on a support in this sequence.

The total coating amount of silver in the silver halide color photographic light-sensitive material is desirably 100 mg/dm$^2$ to 20 mg/dm$^2$, more desirably 80 mg/dm$^2$ to 40 mg/dm$^2$.

The amount of silver contained in each of the low speed, medium speed and high speed layers may be arbitrarily selected within the limit of the total silver amount of 100 mg/dm$^2$ to 20 mg/dm$^2$ and in a manner to increase in the order of the medium speed silver halide emulsion layer, low speed silver halide emulsion layer and high speed silver halide emulsion layer.

The coating amount of silver of the high speed silver halide emulsion layer of the red-sensitive silver halide emulsion layer is preferably larger than the total silver amount in the low speed silver halide emulsion layer and medium speed silver halide emulsion layer, and ranges from 51 wt % to 75 wt %, preferably from 60 wt % to 70 wt %.

When the silver amount in the upper layer or the high speed layer of the red-sensitive emulsion layer is 50 wt % or less of the total silver amount in the red-sensitive layer, the graininess deteriorates on a shadow portion of a portrait, one of the most important photographic subjects, particularly on the neck and its vicinity. Deterioration in graininess is also caused in a blue sky portion of a picture photographed in the daytime of fine weather, leaving an unfavorable finish of images.

When the foregoing silver amount exceeds 75 wt %, a wide exposure latitude, a feature of the negative light-sensitive material, is deteriorated; thus, a large difference in luminance of subjects photographed by amateur photographers cannot be covered and inevitably causes deterioration in graininess or quality of images.

The low speed silver halide emulsion layer, medium speed silver halide emulsion layer and high speed silver halide elusion layer used in the invention may be any of those which are conventionally used in the photographic art.

In the invention, a good graininess and a wide latitude in a high exposure portion can be imparted to the light-sensitive material by increasing the silver amount in each of the low speed, medium speed and high speed silver halide emulsion layer in the order of the medium speed, low speed and high speed emulsion layer.

The silver halide color photographic light-sensitive material of the invention is usable not only as a light-sensitive material for the negative but as a light-sensitive material for the positive.

In the silver halide color photographic light-sensitive material of the invention, any of the conventional silver halide emulsions can be used.

Said emulsion may be chemically sensitized by conventional methods and spectrally sensitized to a desired wavelength range with the addition of a sensitizing dye.

An antifogging agent, stabilizer and the like may be added to the silver halide emulsion. Gelatin is advantageously used as binder for the emulsion.

The emulsion layers and other hydrophilic colloid layers can be hardened. A plasticizer and latex of a water-insoluble or sparingly solulble synthetic polymer may be also incorporated.

Further, there may be contained a colored coupler having a function of color correction, a competing coupler and a compound which releases a useful photographic fragment such as development accelerator, bleach accelerator, developer, solvent for silver halide, toning agent, hardener, fogging agent, antifogging agent, chemical sensitizing agent, spectral sensitizing agent or desensitizing agent upon coupling reaction with an oxidation product of a developing agent.

In the light-sensitive material, there may be provided auxiliary layers such as a filter layer, antihalation layer, anti-irradiation layer, etc. In these auxiliary layers and/or the emulsion layers, there may be contained a dye capable of being bleached or discharged from the light-sensitive material during processing.

Further, there may be added to the light-sensitive material of the invention a formalin scavenger, fluorescent brightening agent, slipping agent, image stabilizer, surfactant, antistain agent, development accelerator, development retarder, bleach accelerator, etc.

Materials for the support are polyethylene laminated paper, polyethylene terephthalate film, baryta paper, cellulose triacetate film, etc.

To form dye images on the light-sensitive material of the invention, conventional color photographic processes can be used.

EXAMPLES

The present invention is hereunder described in more details with the examples, but the scope of the invention is not limited to these examples.

The addition amount of each material in the following examples is g/m$^2$, unless otherwise specified. The amount of silver halide and colloidal silver is a value converted into an equivalent amount of silver. The amount of sensitizing dyes is given in mol/mol Ag.

EXAMPLE 1

On a triacetyl cellulose film support were coated in order the layers of the following composition to prepare Sample 1 of a multilayered color photographic light-sensitive material.

Sample 1 (comparison)

| | |
|---|---|
| 1st layer: antihalation later | |
| Black colloidal silver (coating weight) | 0.2 |
| Gelatin | 0.4 |
| UV-1 | 0.3 |
| High boiling solvent (Oil-1) | 0.3 |
| 2nd layer: intermediate layer | |
| Gelatin | 1.0 |
| 3rd layer: low speed red-sensitive silver halide emulsion layer | |
| Silver bromoiodide (AgI: 7 mol %, octahedron, grain size as converted into cube: 0.3 μm) | 0.6 |
| Gelatin | 1.2 |
| Sensitizing dye (S-1) | $8 \times 10^{-4}$ |
| Sensitizing dye (S-2) | $5 \times 10^{-4}$ |
| Sensitizing dye (S-3) | $3 \times 10^{-5}$ |
| Coupler (C-1) | 0.10 |
| Coupler (C-3) | 0.25 |
| Colored coupler (CC-1) | 0.04 |
| DIR coupler (D-2) | 0.05 |
| High boiling solvent (Oil-1) | 0.45 |
| 4th layer: medium speed red-sensitive silver halide emulsion layer | |
| Silver bromoiodide (AgI: 8 mol %, octahedron, grain size as converted into cube: 0.7 μm) | 1.0 |
| Gelatin | 1.3 |
| Sensitizing dye (S-1) | $3 \times 10^{-4}$ |
| Sensitizing dye (S-2) | $2 \times 10^{-4}$ |
| Sensitizing dye (S-3) | $2 \times 10^{-5}$ |
| Coupler (C-1) | 0.10 |
| Coupler (C-3) | 0.30 |
| Colored coupler (CC-1) | 0.03 |
| DIR coupler (D-2) | 0.07 |
| High boiling solvent (Oil-1) | 0.50 |
| 5th layer: high speed red-sensitive silver halide emulsion layer | |
| Silver bromoiodide (AgI: 6 mol %, octahedron, grain size as converted into cube: 1.0 μm) | 1.6 |
| Gelatin | 1.6 |
| Sensitizing dye (S-1) | $1 \times 10^{-4}$ |
| Sensitizing dye (S-2) | $1 \times 10^{-4}$ |
| Sensitizing dye (S-3) | $1 \times 10^{-5}$ |
| Coupler (C-2) | 0.10 |
| Coupler (C-1) | 0.20 |
| Colored coupler (CC-1) | 0.02 |
| DIR coupler (D-2) | 0.05 |
| High boiling solvent (Oil-1) | 0.40 |
| 6th layer: intermediate layer | |
| Gelatin | 0.80 |
| SC-1 | 0.03 |
| SC-2 | 0.02 |
| High boiling solvent (Oil-2) | 0.05 |
| 7th layer: low speed green-sensitive silver halide emulsion layer | |
| Silver bromoiodide (AgI: 7 mol %, octahedron, grain size as converted into cube: 0.3 μm) | 0.4 |
| Gelatin | 0.8 |
| Sensitizing dye (S-4) | $6 \times 10^{-4}$ |
| Sensitizing dye (S-5) | $1 \times 10^{-4}$ |

-continued

| | |
|---|---|
| Sensitizing dye (S-6) | $1 \times 10^{-4}$ |
| Coupler (M-1) | 0.05 |
| Coupler (M-3) | 0.25 |
| Colored coupler (CM-1) | 0.04 |
| DIR coupler (D-1) | 0.06 |
| High boiling solvent (Oil-2) | 0.40 |
| 8th layer: medium speed green-sensitive silver halide emulsion layer | |
| Silver bromoiodide (AgI: 8 mol %, octahedron, grain size as converted into cube: 0.7 μm) | 0.8 |
| Gelatin | 1.1 |
| Sensitizing dye (S-4) | $3 \times 10^{-4}$ |
| Sensitizing dye (S-5) | $5 \times 10^{-5}$ |
| Sensitizing dye (S-6) | $5 \times 10^{-5}$ |
| Coupler (M-1) | 0.05 |
| Coupler (M-3) | 0.20 |
| Colored coupler (CM-1) | 0.03 |
| DIR coupler (D-1) | 0.05 |
| High boiling solvent (Oil-2) | 0.30 |
| 9th layer: high speed green-sensitive silver halide emulsion layer | |
| Silver bromoiodide (AgI: 6 mol %, octahedron, grain size as converted into cube: 1.0 μm) | 1.2 |
| Gelatin | 1.1 |
| Sensitizing dye (S-4) | $2 \times 10^{-4}$ |
| Sensitizing dye (S-5) | $5 \times 10^{-4}$ |
| Sensitizing dye (S-6) | $5 \times 10^{-4}$ |
| Coupler (M-2) | 0.05 |
| Coupler (M-3) | 0.10 |
| Colored coupler (CM-1) | 0.02 |
| DIR coupler (D-1) | 0.02 |
| High boiling solvent (Oil-2) | 0.30 |
| 10th layer: yellow filter layer | |
| Yellow colloidal silver | 0.05 |
| Gelatin | 1.0 |
| SC-1 | 0.03 |
| SC-2 | 0.02 |
| High boiling solvent (Oil-2) | 0.05 |
| 11th layer: low speed blue-sensitive silver halide emulsion layer | |
| Silver bromoiodide (AgI: 7 mol %, octahedron, grain size as converted into cube: 0.7 μm) | 0.2 |
| Gelatin | 1.3 |
| Sensitizing dye (S-7) | $1 \times 10^{-3}$ |
| Coupler (Y-1) | 0.80 |
| DIR coupler (D-2) | 0.10 |
| High boiling solvent (Oil-2) | 0.28 |
| 12th layer: medium speed blue-sensitive silver halide emulsion layer | |
| Silver bromoiodide (AgI: 8 mol %, octahedron, grain size as converted into cube: 0.7 μm) | 0.50 |
| Gelatin | 0.50 |
| Sensitizing dye (S-7) | $5 \times 10^{-4}$ |
| Coupler (Y-1) | 0.60 |
| DIR coupler (D-2) | 0.08 |
| High boiling solvent (Oil-2) | 0.25 |
| 13th layer: high speed blue-sensitive silver halide emulsion layer | |
| Silver bromoiodide (AgI: 6 mol %, octahedron, grain size as converted into cube: 1.0 μm) | 0.70 |
| Gelatin | 0.70 |
| Sensitizing dye (S-7) | $2 \times 10^{-4}$ |
| Coupler (Y-1) | 0.20 |
| DIR coupler (D-2) | 0.01 |
| High boiling solvent (Oil-2) | 0.07 |
| 14th layer: 1st protective layer | |
| Silver bromoiodide (AgI: 1 mol %, average grain size: 0.08 μm) | 0.3 |
| Gelatin | 1.0 |
| UV absorbent (UV-1) | 0.1 |
| UV absorbent (UV-2) | 0.1 |
| Formalin scavenger (HS-1) | 0.5 |
| Formalin scavenger (HS-2) | 0.2 |
| High boiling solvent (Oil-1) | 0.1 |
| High boiling solvent (Oil-3 | 0.1 |
| 15th layer: 2nd protective layer | |
| Gelatin | 0.7 |
| Alkali-soluble matting agent (average particle size: 2 μm) | 0.12 |
| Polymethylmethacrylate particle | 0.02 |

-continued

| | |
|---|---|
| (average particle size: 3 μm) | |
| Slipping agent (wax-1) | 0.04 |
| Static control agent (Su-1) | 0.004 |

In addition to the above compounds, a coating aid (Su-2), dispersing agents (Su-2 and Su-3), gelatin hardeners (H-1 and H-2), a stabilizer (Stab-1), antifogging agents (AF-1 and AF-2) and a antiseptic agent (D1-I) were added to each layer.

Chemical structures of the compounds contained in Sample 1 are as follows:

S-1

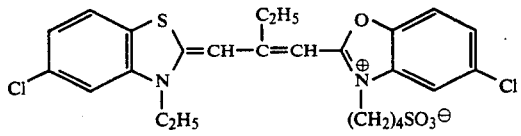

S-2

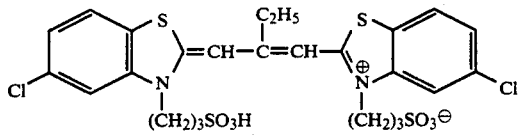

S-3

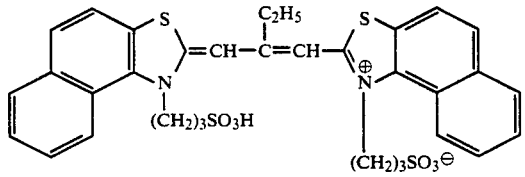

S-4

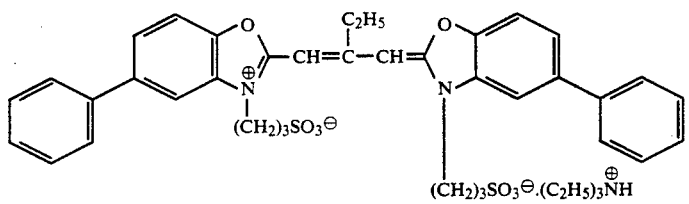

S-5

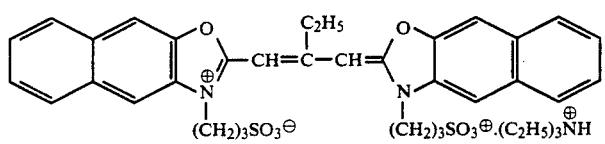

S-6

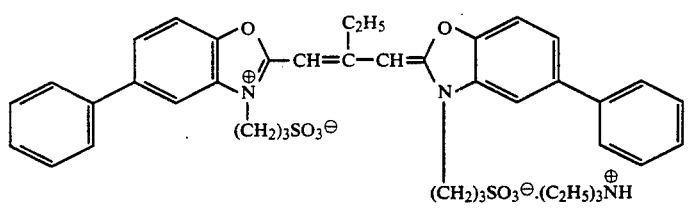

S-7

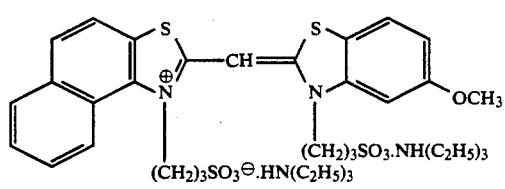

C-1

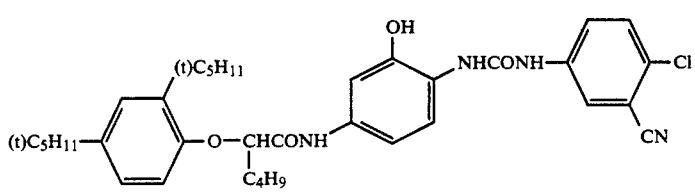

-continued
C-2
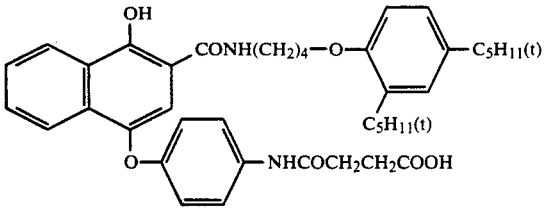
C-3
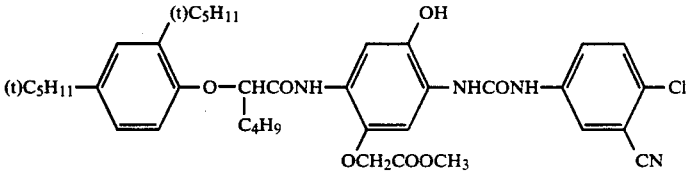
Y-1
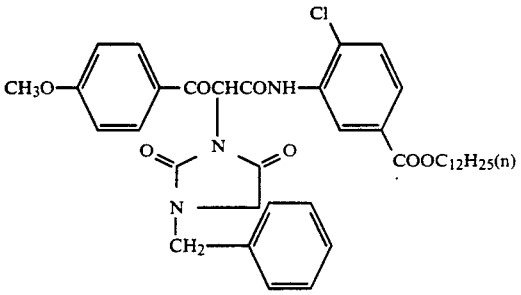
M-1
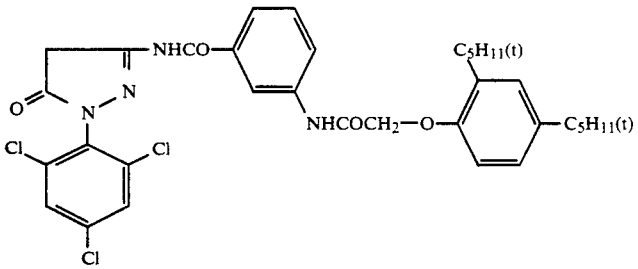
M-2
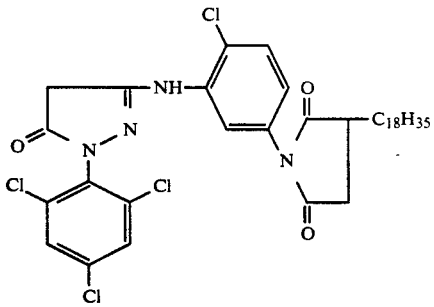
M-3
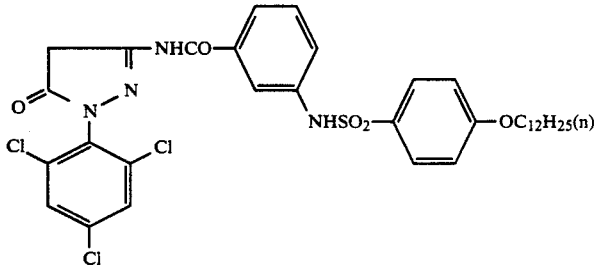

-continued
CM-1
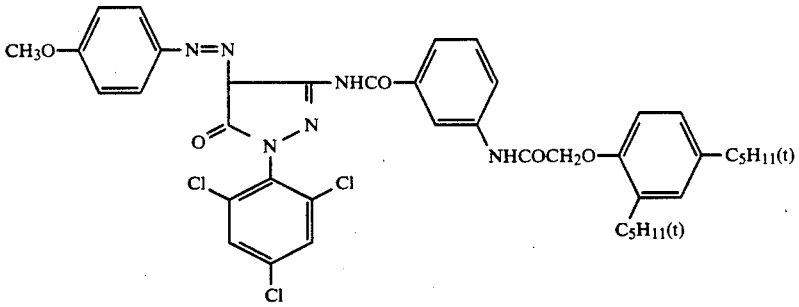
CC-1
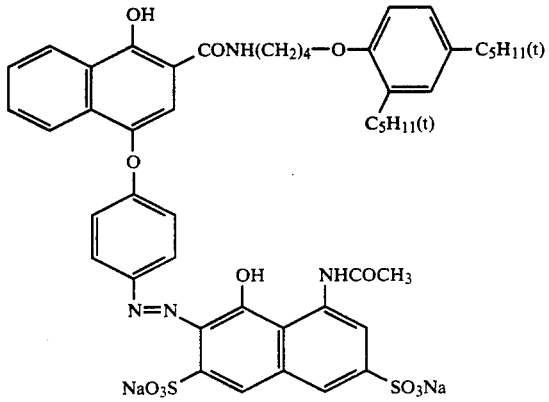
D-1
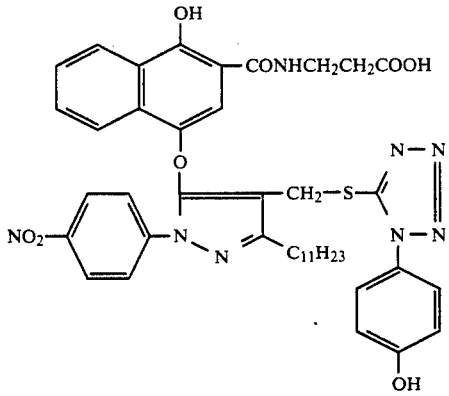
D-2
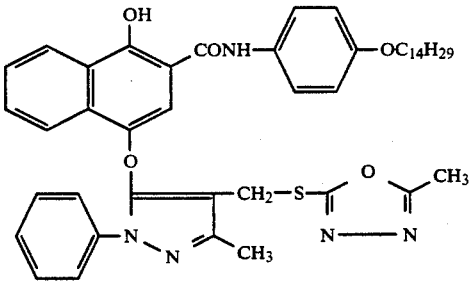
UV-1
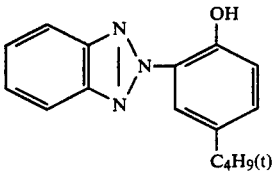

-continued
UV-2
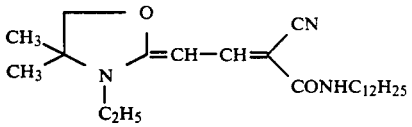
HS-1
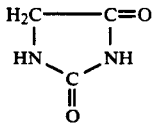
HS-2
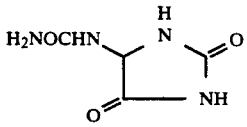
H-1
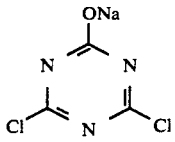
H-2
$(CH_2{=}CHSO_2CH_2)_2O$
Su-1
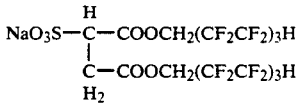
Su-2
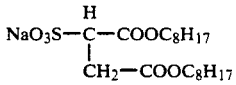
Su-3
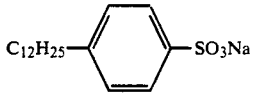
Sc-1
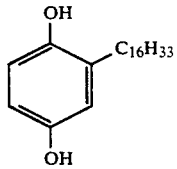
Sc-2
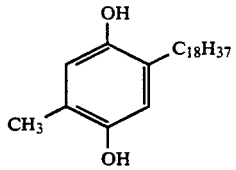
WAX-1
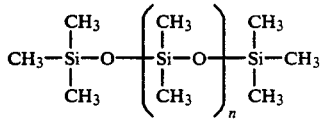
$\overline{MW}$: 30,000
Oil-1
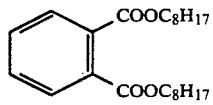

-continued

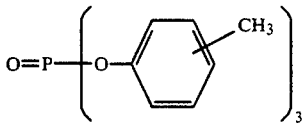

Oil-2

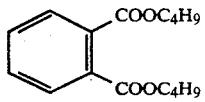

Oil-3

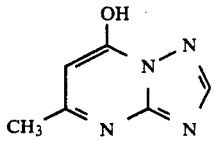

Stab-1

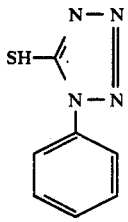

AF-1

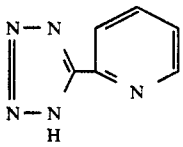

AF-2

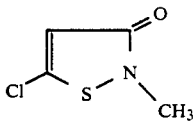

DI-I

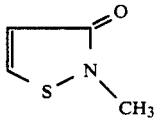

Samples 2 to 11 were prepared by varying the compositions of 7th, 8th and 9th layers of green-sensitive silver halide emulsion layers, each a low, medium, high speed layer, respectively, in Sample 1 as follows:

Sample 2 (comparison)

| | |
|---|---|
| 7th layer: low speed green-sensitive silver halide emulsion layer | |
| Silver bromoiodide (AgI: 7 mol %, octahedron, grain size as converted into cube: 0.3 μm) | 0.4 |
| Gelatin | 0.8 |
| Sensitizing dye (S-4) | $6 \times 10^{-4}$ |
| Sensitizing dye (S-5) | $1 \times 10^{-4}$ |
| Sensitizing dye (S-6) | $1 \times 10^{-4}$ |
| Coupler (M-1) | 0.05 |
| Coupler (M-3) | 0.25 |
| Colored coupler (CM-1) | 0.04 |
| DIR coupler (D-1) | 0.06 |
| High boiling solvent (Oil-2) | 0.40 |
| 8th layer: medium speed green-sensitive silver halide emulsion layer | |
| Silver bromoiodide (AgI: 8 mol %, octahedron, grain size as converted into cube: 0.7 μm) | 1.0 |
| Gelatin | 1.3 |

-continued

| | |
|---|---|
| Sensitizing dye (S-4) | $3 \times 10^{-4}$ |
| Sensitizing dye (S-5) | $5 \times 10^{-5}$ |
| Sensitizing dye (S-6) | $5 \times 10^{-5}$ |
| Coupler (M-1) | 0.06 |
| Coupler (M-3) | 0.24 |
| Colored coupler (CM-1) | 0.04 |
| DIR coupler (D-1) | 0.06 |
| High boiling solvent (Oil-2) | 0.36 |
| 9th layer: high speed green-sensitive silver halide emulsion layer | |
| Silver bromoiodide (AgI: 6 mol %, octahedron, grain size as converted into cube: 1.0 μm) | 1.0 |
| Gelatin | 1.0 |
| Sensitizing dye (S-4) | $2 \times 10^{-4}$ |
| Sensitizing dye (S-5) | $5 \times 10^{-4}$ |
| Sensitizing dye (S-6) | $5 \times 10^{-4}$ |
| Coupler (M-2) | 0.04 |
| Coupler (M-3) | 0.09 |
| Colored coupler (CM-1) | 0.02 |
| DIR coupler (D-1) | 0.02 |
| High boiling solvent (Oil-2) | 0.30 |

Sample 3 (comparison)

| | |
|---|---|
| 7th layer: low speed green-sensitive silver halide emulsion layer | |
| Silver bromoiodide (AgI: 7 mol %, octahedron, grain size as converted into cube: 0.3 μm) | 0.6 |
| Gelatin | 1.2 |
| Sensitizing dye (S-4) | $6 \times 10^{-4}$ |
| Sensitizing dye (S-5) | $1 \times 10^{-4}$ |
| Sensitizing dye (S-6) | $1 \times 10^{-4}$ |
| Coupler (M-1) | 0.08 |
| Coupler (M-3) | 0.40 |
| Colored coupler (CM-1) | 0.06 |
| DIR coupler (D-1) | 0.09 |
| High boiling solvent (Oil-2) | 0.60 |
| 8th layer: medium speed green-sensitive silver halide emulsion layer | |
| Silver bromoiodide (AgI: 8 mol %, octahedron, grain size as converted into cube: 0.7 μm) | 0.6 |
| Gelatin | 0.8 |
| Sensitizing dye (S-4) | $3 \times 10^{-4}$ |
| Sensitizing dye (S-5) | $5 \times 10^{-5}$ |
| Sensitizing dye (S-6) | $5 \times 10^{-5}$ |
| Coupler (M-1) | 0.04 |
| Coupler (M-3) | 0.15 |
| Colored coupler (CM-1) | 0.02 |
| DIR coupler (D-1) | 0.04 |
| High boiling solvent (Oil-2) | 0.25 |
| 9th layer: high speed green-sensitive silver halide emulsion layer | |
| Silver bromoiodide (AgI: 6 mol %, octahedron, grain size as converted into cube: 1.0 μm) | 1.2 |
| Gelatin | 1.1 |
| Sensitizing dye (S-4) | $2 \times 10^{-4}$ |
| Sensitizing dye (S-5) | $5 \times 10^{-4}$ |
| Sensitizing dye (S-6) | $5 \times 10^{-4}$ |
| Coupler (M-2) | 0.05 |
| Coupler (M-3) | 0.10 |
| Colored coupler (CM-1) | 0.02 |
| DIR coupler (D-1) | 0.02 |
| High boiling solvent (Oil-2) | 0.30 |

Sample 4 (invention)

| | |
|---|---|
| 7th layer: low speed green-sensitive silver halide emulsion layer | |
| Silver bromoiodide (AgI: 7 mol %, octahedron, grain size as converted into cube: 0.3 μm) | 0.7 |
| Gelatin | 1.4 |
| Sensitizing dye (S-4) | $6 \times 10^{-4}$ |
| Sensitizing dye (S-5) | $1 \times 10^{-4}$ |
| Sensitizing dye (S-6) | $1 \times 10^{-4}$ |
| Coupler (M-1) | 0.09 |
| Coupler (M-3) | 0.44 |
| Colored coupler (CM-1) | 0.07 |
| DIR coupler (D-1) | 0.11 |
| High boiling solvent (Oil-2) | 0.70 |
| 8th layer: medium speed green-sensitive silver halide emulsion layer | |
| Silver bromoiodide (AgI: 8 mol %, octahedron, grain size as converted into cube: 0.7 μm) | 0.5 |
| Gelatin | 0.7 |
| Sensitizing dye (S-4) | $3 \times 10^{-4}$ |
| Sensitizing dye (S-5) | $5 \times 10^{-5}$ |
| Sensitizing dye (S-6) | $5 \times 10^{-5}$ |
| Coupler (M-1) | 0.03 |
| Coupler (M-3) | 0.13 |
| Colored coupler (CM-1) | 0.02 |
| DIR coupler (D-1) | 0.03 |
| High boiling solvent (Oil-2) | 0.19 |
| 9th layer: high speed green-sensitive silver halide emulsion layer | |
| Silver bromoiodide (AgI: 6 mol %, octahedron, grain size as converted into cube: 1.0 μm) | 1.2 |
| Gelatin | 1.1 |
| Sensitizing dye (S-4) | $2 \times 10^{-4}$ |
| Sensitizing dye (S-5) | $5 \times 10^{-4}$ |
| Sensitizing dye (S-6) | $5 \times 10^{-4}$ |

-continued

| | |
|---|---|
| Coupler (M-2) | 0.05 |
| Coupler (M-3) | 0.10 |
| Colored coupler (CM-1) | 0.02 |
| DIR coupler (D-1) | 0.02 |
| High boiling solvent (Oil-2) | 0.30 |

Sample 5 (invention)

| | |
|---|---|
| 7th layer: low speed green-sensitive silver halide emulsion layer | |
| Silver bromoiodide (AgI: 7 mol %, octahedron, grain size as converted into cube: 0.3 μm) | 0.9 |
| Gelatin | 1.8 |
| Sensitizing dye (S-4) | $6 \times 10^{-4}$ |
| Sensitizing dye (S-5) | $1 \times 10^{-4}$ |
| Sensitizing dye (S-6) | $1 \times 10^{-4}$ |
| Coupler (M-1) | 0.11 |
| Coupler (M-3) | 0.56 |
| Colored coupler (CM-1) | 0.09 |
| DIR coupler (D-1) | 0.14 |
| High boiling solvent (Oil-2) | 0.90 |
| 8th layer: medium speed green-sensitive silver halide emulsion layer | |
| Silver bromoiodide (AgI: 8 mol %, octahedron, grain size as converted into cube: 0.7 μm) | 0.5 |
| Gelatin | 0.7 |
| Sensitizing dye (S-4) | $3 \times 10^{-4}$ |
| Sensitizing dye (S-5) | $5 \times 10^{-5}$ |
| Sensitizing dye (S-6) | $5 \times 10^{-5}$ |
| Coupler (M-1) | 0.03 |
| Coupler (M-3) | 0.13 |
| Colored coupler (CM-1) | 0.02 |
| DIR coupler (D-1) | 0.03 |
| High boiling solvent (Oil-2) | 0.19 |
| 9th layer: high speed green-sensitive silver halide emulsion layer | |
| Silver bromoiodide (AgI: 6 mol %, octahedron, grain size as converted into cube: 1.0 μm) | 1.0 |
| Gelatin | 0.9 |
| Sensitizing dye (S-4) | $2 \times 10^{-4}$ |
| Sensitizing dye (S-5) | $5 \times 10^{-4}$ |
| Sensitizing dye (S-6) | $5 \times 10^{-4}$ |
| Coupler (M-2) | 0.04 |
| Coupler (M-3) | 0.08 |
| Colored coupler (CM-1) | 0.02 |
| DIR coupler (D-1) | 0.02 |
| High boiling solvent (Oil-2) | 0.25 |

Sample 6 (invention)

| | |
|---|---|
| 7th layer: low speed green-sensitive silver halide emulsion layer | |
| Silver bromoiodide (AgI: 7 mol %, octahedron, grain size as converted into cube: 0.3 μm) | 0.9 |
| Gelatin | 1.8 |
| Sensitizing dye (S-4) | $6 \times 10^{-4}$ |
| Sensitizing dye (S-5) | $1 \times 10^{-4}$ |
| Sensitizing dye (S-6) | $1 \times 10^{-4}$ |
| Coupler (M-1) | 0.11 |
| Coupler (M-3) | 0.56 |
| Colored coupler (CM-1) | 0.09 |
| DIR coupler (D-1) | 0.14 |
| High boiling solvent (Oil-2) | 0.90 |
| 8th layer: medium speed green-sensitive silver halide emulsion layer | |
| Silver bromoiodide (AgI: 8 mol %, octahedron, grain size as converted into cube: 0.7 μm) | 0.4 |
| Gelatin | 0.6 |
| Sensitizing dye (S-4) | $3 \times 10^{-4}$ |
| Sensitizing dye (S-5) | $5 \times 10^{-5}$ |
| Sensitizing dye (S-6) | $5 \times 10^{-5}$ |
| Coupler (M-1) | 0.03 |
| Coupler (M-3) | 0.10 |
| Colored coupler (CM-1) | 0.02 |
| DIR coupler (D-1) | 0.03 |

-continued

| | |
|---|---|
| High boiling solvent (Oil-2) | 0.17 |
| 9th layer: high speed green-sensitive silver halide emulsion layer | |
| Silver bromoiodide (AgI: 6 mol %, octahedron, grain size as converted into cube: 1.0 μm) | 1.0 |
| Gelatin | 0.9 |
| Sensitizing dye (S-4) | $2 \times 10^{-4}$ |
| Sensitizing dye (S-5) | $5 \times 10^{-4}$ |
| Sensitizing dye (S-6) | $5 \times 10^{-4}$ |
| Coupler (M-2) | 0.04 |
| Coupler (M-3) | 0.08 |
| Colored coupler (CM-1) | 0.02 |
| DIR coupler (D-1) | 0.02 |
| High boiling solvent (Oil-2) | 0.25 |

Sample 7 (invention)

| | |
|---|---|
| 7th layer: low speed green-sensitive silver halide emulsion layer | |
| Silver bromoiodide (AgI: 7 mol %, octahedron, grain size as converted into cube: 0.3 μm) | 0.9 |
| Gelatin | 1.8 |
| Sensitizing dye (S-4) | $6 \times 10^{-4}$ |
| Sensitizing dye (S-5) | $1 \times 10^{-4}$ |
| Sensitizing dye (S-6) | $1 \times 10^{-4}$ |
| Coupler (M-1) | 0.11 |
| Coupler (M-3) | 0.56 |
| Colored coupler (CM-1) | 0.09 |
| DIR coupler (D-1) | 0.14 |
| High boiling solvent (Oil-2) | 0.90 |
| 8th layer: medium speed green-sensitive silver halide emulsion layer | |
| Silver bromoiodide (AgI: 8 mol %, octahedron, grain size as converted into cube: 0.7 μm) | 0.5 |
| Gelatin | 0.7 |
| Sensitizing dye (S-4) | $3 \times 10^{-4}$ |
| Sensitizing dye (S-5) | $5 \times 10^{-5}$ |
| Sensitizing dye (S-6) | $5 \times 10^{-5}$ |
| Coupler (M-1) | 0.03 |
| Coupler (M-3) | 0.13 |
| Colored coupler (CM-1) | 0.02 |
| DIR coupler (D-1) | 0.03 |
| High boiling solvent (Oil-2) | 0.19 |
| 9th layer: high speed green-sensitive silver halide emulsion layer | |
| Silver bromoiodide (AgI: 6 mol %, octahedron, grain size as converted into cube: 1.0 μm) | 1.2 |
| Gelatin | 1.1 |
| Sensitizing dye (S-4) | $2 \times 10^{-4}$ |
| Sensitizing dye (S-5) | $5 \times 10^{-4}$ |
| Sensitizing dye (S-6) | $5 \times 10^{-4}$ |
| Coupler (M-2) | 0.05 |
| Coupler (M-3) | 0.10 |
| Colored coupler (CM-1) | 0.02 |
| DIR coupler (D-1) | 0.02 |
| High boiling solvent (Oil-2) | 0.30 |

Sample 8 (invention)

| | |
|---|---|
| 7th layer: low speed green-sensitive silver halide emulsion layer | |
| Silver bromoiodide (AgI: 7 mol %, octahedron, grain size as converted into cube: 0.3 μm) | 1.0 |
| Gelatin | 2.0 |
| Sensitizing dye (S-4) | $6 \times 10^{-4}$ |
| Sensitizing dye (S-5) | $1 \times 10^{-4}$ |
| Sensitizing dye (S-6) | $1 \times 10^{-4}$ |
| Coupler (M-1) | 0.13 |
| Coupler (M-3) | 0.63 |
| Colored coupler (CM-1) | 0.10 |
| DIR coupler (D-1) | 0.15 |
| High boiling solvent (Oil-2) | 1.0 |
| 8th layer: medium speed green-sensitive silver halide emulsion layer | |
| Silver bromoiodide (AgI: 8 mol %, octahedron, grain size as converted into cube: 0.7 μm) | 0.8 |
| Gelatin | 1.1 |
| Sensitizing dye (S-4) | $3 \times 10^{-4}$ |
| Sensitizing dye (S-5) | $5 \times 10^{-5}$ |
| Sensitizing dye (S-6) | $5 \times 10^{-5}$ |
| Coupler (M-1) | 0.05 |
| Coupler (M-3) | 0.20 |
| Colored coupler (CM-1) | 0.03 |
| DIR coupler (D-1) | 0.05 |
| High boiling solvent (Oil-2) | 0.30 |
| 9th layer: high speed green-sensitive silver halide emulsion layer | |
| Silver bromoiodide (AgI: 6 mol %, octahedron, grain size as converted into cube: 1.0 m) | 1.2 |
| Gelatin | 1.1 |
| Sensitizing dye (S-4) | $2 \times 10^{-4}$ |
| Sensitizing dye (S-5) | $5 \times 10^{-4}$ |
| Sensitizing dye (S-6) | $5 \times 10^{-4}$ |
| Coupler (M-2) | 0.05 |
| Coupler (M-3) | 0.10 |
| Colored coupler (CM-1) | 0.02 |
| DIR coupler (D-1) | 0.02 |
| High boiling solvent (Oil-2) | 0.30 |

Sample 9 (invention)

| | |
|---|---|
| 7th layer: low speed green-sensitive silver halide emulsion layer | |
| Silver bromoiodide (AgI: 7 mol %, octahedron, grain size as converted into cube: 0.3 μm) | 1.0 |
| Gelatin | 2.0 |
| Sensitizing dye (S-4) | $6 \times 10^{-4}$ |
| Sensitizing dye (S-5) | $1 \times 10^{-4}$ |
| Sensitizing dye (S-6) | $1 \times 10^{-4}$ |
| Coupler (M-1) | 0.13 |
| Coupler (M-3) | 0.63 |
| Colored coupler (CM-1) | 0.10 |
| DIR coupler (D-1) | 0.15 |
| High boiling solvent (Oil-2) | 1.0 |
| 8th layer: medium speed green-sensitive silver halide emulsion layer | |
| Silver bromoiodide (AgI: 8 mol %, octahedron, grain size as converted into cube: 0.7 μm) | 0.6 |
| Gelatin | 0.8 |
| Sensitizing dye (S-4) | $3 \times 10^{-4}$ |
| Sensitizing dye (S-5) | $5 \times 10^{-5}$ |
| Sensitizing dye (S-6) | $5 \times 10^{-5}$ |
| Coupler (M-1) | 0.04 |
| Coupler (M-3) | 0.15 |
| Colored coupler (CM-1) | 0.02 |
| DIR coupler (D-1) | 0.04 |
| High boiling solvent (Oil-2) | 0.23 |
| 9th layer: high speed green-sensitive silver halide emulsion layer | |
| Silver bromoiodide (AgI: 6 mol %, octahedron, grain size as converted into cube: 1.0 μm) | 1.2 |
| Gelatin | 1.1 |
| Sensitizing dye (S-4) | $2 \times 10^{-4}$ |
| Sensitizing dye (S-5) | $5 \times 10^{-4}$ |
| Sensitizing dye (S-6) | $5 \times 10^{-4}$ |
| Coupler (M-2) | 0.05 |
| Coupler (M-3) | 0.10 |
| Colored coupler (CM-1) | 0.02 |
| DIR coupler (D-1) | 0.02 |
| High boiling solvent (Oil-2) | 0.30 |

Sample 10 (invention)

| | |
|---|---|
| 7th layer: low speed green-sensitive silver halide emulsion layer | |
| Silver bromoiodide (AgI: 7 mol %, octahedron, grain size as converted into cube: 0.3 μm) | 1.0 |
| Gelatin | 2.4 |
| Sensitizing dye (S-4) | $6 \times 10^{-4}$ |
| Sensitizing dye (S-5) | $1 \times 10^{-4}$ |

-continued

| | |
|---|---|
| Sensitizing dye (S-6) | $1 \times 10^{-4}$ |
| Coupler (M-1) | 0.19 |
| Coupler (M-3) | 0.94 |
| Colored coupler (CM-1) | 0.15 |
| DIR coupler (D-1) | 0.23 |
| High boiling solvent (Oil-2) | 1.5 |
| 8th layer: medium speed green-sensitive silver halide emulsion layer | |
| Silver bromoiodide (AgI: 8 mol %, octahedron, grain size as converted into cube: 0.7 μm) | 0.6 |
| Gelatin | 1.1 |
| Sensitizing dye (S-4) | $3 \times 10^{-4}$ |
| Sensitizing dye (S-5) | $5 \times 10^{-5}$ |
| Sensitizing dye (S-6) | $5 \times 10^{-5}$ |
| Coupler (M-1) | 0.05 |
| Coupler (M-3) | 0.20 |
| Colored coupler (CM-1) | 0.03 |
| DIR coupler (D-1) | 0.05 |
| High boiling solvent (Oil-2) | 0.30 |
| 9th layer: high speed green-sensitive silver halide emulsion layer | |
| Silver bromoiodide (AgI: 6 mol %, octahedron, grain size as converted into cube: 1.0 μm) | 1.2 |
| Gelatin | 1.1 |
| Sensitizing dye (S-4) | $2 \times 10^{-4}$ |
| Sensitizing dye (S-5) | $5 \times 10^{-4}$ |
| Sensitizing dye (S-6) | $5 \times 10^{-4}$ |
| Coupler (M-2) | 0.04 |
| Coupler (M-3) | 0.08 |
| Colored coupler (CM-1) | 0.02 |
| DIR coupler (D-1) | 0.02 |
| High boiling solvent (Oil-2) | 0.28 |

Sample 11 (invention)

| | |
|---|---|
| 7th layer: low speed green-sensitive silver halide emulsion layer | |
| Silver bromoiodide (AgI: 7 mol %, octahedron, grain size as converted into cube: 0.3 μm) | 1.0 |
| Gelatin | 2.4 |
| Sensitizing dye (S-4) | $6 \times 10^{-4}$ |
| Sensitizing dye (S-5) | $1 \times 10^{-4}$ |
| Sensitizing dye (S-6) | $1 \times 10^{-4}$ |
| Coupler (M-1) | 0.19 |
| Coupler (M-3) | 0.94 |
| Colored coupler (CM-1) | 0.15 |
| DIR coupler (D-1) | 0.23 |
| High boiling solvent (Oil-2) | 1.5 |
| 8th layer: medium speed green-sensitive silver halide emulsion layer | |
| Silver bromoiodide (AgI: 8 mol %, octahedron, grain size as converted into cube: 0.7 μm) | 0.6 |
| Gelatin | 1.1 |
| Sensitizing dye (S-4) | $3 \times 10^{-4}$ |
| Sensitizing dye (S-5) | $5 \times 10^{-5}$ |
| Sensitizing dye (S-6) | $5 \times 10^{-5}$ |
| Coupler (M-1) | 0.05 |
| Coupler (M-3) | 0.20 |
| Colored coupler (CM-1) | 0.03 |
| DIR coupler (D-1) | 0.05 |
| High boiling solvent (Oil-2) | 0.30 |
| 9th layer: high speed green-sensitive silver halide emulsion layer | |
| Silver bromoiodide (AgI: 6 mol %, octahedron, grain size as converted into cube: 1.0 μm) | 1.2 |
| Gelatin | 1.1 |
| Sensitizing dye (S-4) | $2 \times 10^{-4}$ |
| Sensitizing dye (S-5) | $5 \times 10^{-4}$ |
| Sensitizing dye (S-6) | $5 \times 10^{-4}$ |
| Coupler (M-2) | 0.06 |
| Coupler (M-3) | 0.12 |
| Colored coupler (CM-1) | 0.03 |
| DIR coupler (D-1) | 0.03 |
| High boiling solvent (Oil-2) | 0.35 |

Samples 1 to 11 prepared as above were subjected to imagewise exposure to white light, and color-developed by the following process [I].

| | |
|---|---|
| Color developing | 3 min 15 sec |
| Bleaching | 6 min 30 sec |
| Washing | 3 min 15 sec |
| Fixing | 6 min 30 sec |
| Washing | 3 min 15 sec |
| Stabilizing | 1 min 30 sec |
| Drying | |

Composition of each processing solution was as follows:

| | |
|---|---|
| (Color developer) | |
| 4-amino-3-methyl-N-ethyl-N-(β-hydroxyethyl)-aniline sulfate | 4.75 g |
| Anhydrous sodium sulfite | 4.25 g |
| Hydroxylamine ½ sulfate | 2.0 g |
| Anhydrous potassium carbonate | 37.5 g |
| Sodium bromide | 1.3 g |
| Trisodium nitrilotriacetate monohydrate | 2.5 g |
| Potassium hydroxide | 1.0 g |
| Water was added to make 1 l. | |
| (Bleacher) | |
| Ammonium ferric ethylenediamine tetracetate | 100.0 g |
| Diammonium ethylenediamine tetracetate | 10.0 g |
| Ammonium bromide | 150.0 g |
| Glacial acetic acid | 10.0 ml |
| Water was added to make 1 l, and pH was adjusted to 6.0 with aqueous ammonia. | |
| (Fixer) | |
| Ammonium thiosulfate | 175.0 g |
| Anhydrous sodium sulfite | 8.5 g |
| Sodium metasulfite | 2.3 g |
| Water was added to make 1 l, and pH was adjusted to 6.0 with acetic acid. | |
| (Stabilizer) | |
| Formalin (37% solution) | 1.5 ml |
| Koniducks (made by Konica Corp.) | 7.5 ml |
| Water was added to make 1 l. | |

On the processed samples, the magenta dye densities yielded by varied exposures were measured to obtain a photographic sensitometry characteristic curve.

The exposure necessary to give a density of the minimum magenta density (Dmin)+0.15 is defined as S1 by photographic sensitometry. Further, $S_2$ to $S_5$ were defined as follows, and these characteristic points were determined on each sample:

$$S_2 = Dmin + 0.80$$

$$S_3 = Dmin + 1.5$$

$$S_4 = S_1 + 2.0 \log E$$

$$S_5 = S_1 + 2.8 \log E$$

At the density points of $S_2$ and $S_3$, the densities were measured with a microdensitometer having an aperture area of 250 $\mu m^2$, thereby the RMS granularities were determined. The results are shown in Table 1 as $S_2$RMS and $S_3$RMS, respectively.

Next, the color density difference (D) between the exposure points of $S_4$ and $S_5$ was determined on each sample. The results are also shown in Table 1.

The relative RMS granularities are expressed by values relative to $S_2$RMS and $S_3$RMS of Sample 1 both of which are set at 100.

TABLE 1

| | Sample No. | Granularity $S_2$RMS | Granularity $S_3$RMS | Density in high exposure portion (Δ D) |
|---|---|---|---|---|
| Comparison | 1 | 100 | 100 | 0.15 |
| | 2 | 95 | 120 | 0.10 |
| | 3 | 120 | 95 | 0.15 |
| Invention | 4 | 95 | 85 | 0.20 |
| | 5 | 90 | 70 | 0.30 |
| | 6 | 95 | 75 | 0.30 |
| | 7 | 90 | 70 | 0.30 |
| | 8 | 85 | 65 | 0.40 |
| | 9 | 90 | 70 | 0.40 |
| | 10 | 80 | 65 | 0.55 |
| | 11 | 90 | 65 | 0.55 |

As apparent from the results in Table 1, the samples of the invention exhibit smaller RMS granularities than the comparative samples at the points of $S_2$ and $S_3$, this indicates that the graininess is improved in the samples of the invention. Further, the density differences in high exposure portions are larger in the samples of the invention; therefore, the difference in image density can be expressed more distinctively in a high exposure portion, and thus high details in a highlight portion can be obtained.

EXAMPLE 2

Sample 12 of a multilayered color photographic light-sensitive material was prepared by coating the same layers as in Sample 1 of Example 1 in like manner on a triacetyl cellulose film support, except that the red-sensitive layers of the 3rd, 4th and 5th layers of Sample 1, each a low, medium and highspeed layer, respectively, were changed as follows:

Sample 12 (comparison)

| | |
|---|---|
| 3rd layer: low speed red-sensitive silver halide emulsion layer | |
| Silver bromoiodide (AgI: 7 mol %, octahedron, grain size as converted into cube: 0.3 μm) | 1.0 |
| Gelatin | 1.2 |
| Sensitizing dye (S-1) | $8 \times 10^{-4}$ |
| Sensitizing dye (S-2) | $5 \times 10^{-4}$ |
| Sensitizing dye (S-3) | $3 \times 10^{-5}$ |
| Coupler (C-1) | 0.17 |
| Coupler (C-3) | 0.42 |
| Colored coupler (CC-1) | 0.07 |
| DIR coupler (D-2) | 0.08 |
| High boiling solvent (Oil-1) | 0.75 |
| 4th layer: medium speed red-sensitive silver halide emulsion layer | |
| Silver bromoiodide (AgI: 8 mol %, octahedron, grain size as converted into cube: 0.7 μm) | 1.0 |
| Gelatin | 1.3 |
| Sensitizing dye (S-1) | $3 \times 10^{-4}$ |
| Sensitizing dye (S-2) | $2 \times 10^{-4}$ |
| Sensitizing dye (S-3) | $2 \times 10^{-5}$ |
| Coupler (C-1) | 0.10 |
| Coupler (C-3) | 0.30 |
| Colored coupler (CC-1) | 0.03 |
| DIR coupler (D-2) | 0.07 |
| High boiling solvent (Oil-1) | 0.50 |
| 5th layer: high speed red-sensitive silver halide emulsion layer | |
| Silver bromoiodide (AgI: 6 mol %, octahedron, grain size as converted into cube: 1.0 μm) | 1.6 |
| Gelatin | 1.6 |
| Sensitizing dye (S-1) | $1 \times 10^{-4}$ |
| Sensitizing dye (S-2) | $1 \times 10^{-4}$ |
| Sensitizing dye (S-3) | $1 \times 10^{-5}$ |
| Coupler (C-2) | 0.10 |
| Coupler (C-1) | 0.20 |
| Colored coupler (CC-1) | 0.02 |
| DIR coupler (D-2) | 0.05 |
| High boiling solvent (Oil-1) | 0.40 |

Samples 13 to 21 were prepared by varying the red-sensitive silver halide emulsion layers of the 3rd, 4th and 5th layers in Sample 12.

Sample 13 (comparison)

| | |
|---|---|
| 3rd layer: low speed red-sensitive silver halide emulsion layer | |
| Silver bromoiodide (AgI: 7 mol %, octahedron, grain size as converted into cube: 0.3 μm) | 1.2 |
| Gelatin | 1.2 |
| Sensitizing dye (S-1) | $8 \times 10^{-4}$ |
| Sensitizing dye (S-2) | $5 \times 10^{-4}$ |
| Sensitizing dye (S-3) | $3 \times 10^{-5}$ |
| Coupler (C-1) | 0.17 |
| Coupler (C-3) | 0.42 |
| Colored coupler (CC-1) | 0.07 |
| DIR coupler (D-2) | 0.08 |
| High boiling solvent (Oil-1) | 0.75 |
| 4th layer: medium speed red-sensitive silver halide emulsion layer | |
| Silver bromoiodide (AgI: 8 mol %, octahedron, grain size as converted into cube: 0.7 μm) | 1.2 |
| Gelatin | 1.3 |
| Sensitizing dye (S-1) | $3 \times 10^{-4}$ |
| Sensitizing dye (S-2) | $2 \times 10^{-4}$ |
| Sensitizing dye (S-3) | $2 \times 10^{-5}$ |
| Coupler (C-1) | 0.10 |
| Coupler (C-3) | 0.30 |
| Colored coupler (CC-1) | 0.03 |
| DIR coupler (D-2) | 0.07 |
| High boiling solvent (Oil-1) | 0.50 |
| 5th layer: high speed red-sensitive silver halide emulsion layer | |
| Silver bromoiodide (AgI: 6 mol %, octahedron, grain size as converted into cube: 1.0 μm) | 1.8 |
| Gelatin | 1.6 |
| Sensitizing dye (S-1) | $1 \times 10^{-4}$ |
| Sensitizing dye (S-2) | $1 \times 10^{-4}$ |
| Sensitizing dye (S-3) | $1 \times 10^{-5}$ |
| Coupler (C-2) | 0.10 |
| Coupler (C-1) | 0.20 |
| Colored coupler (CC-1) | 0.02 |
| DIR coupler (D-2) | 0.05 |
| High boiling solvent (Oil-1) | 0.40 |

Sample 14 (comparison)

| | |
|---|---|
| 3rd layer: low speed red-sensitive silver halide emulsion layer | |
| Silver bromoiodide (AgI: 7 mol %, octahedron, grain size as converted into cube: 0.3 μm) | 1.2 |
| Gelatin | 1.2 |
| Sensitizing dye (S-1) | $8 \times 10^{-4}$ |
| Sensitizing dye (S-2) | $5 \times 10^{-4}$ |
| Sensitizing dye (S-3) | $3 \times 10^{-5}$ |
| Coupler (C-1) | 0.70 |
| Coupler (C-3) | 0.42 |
| Colored coupler (CC-1) | 0.07 |
| DIR coupler (D-2) | 0.08 |
| High boiling solvent (Oil-1) | 0.75 |
| 4th layer: medium speed red-sensitive silver halide emulsion layer | |
| Silver bromoiodide (AgI: 8 mol %, octahedron, grain size as converted into cube: 0.7 μm) | 1.5 |
| Gelatin | 2.0 |
| Sensitizing dye (S-1) | $3 \times 10^{-4}$ |
| Sensitizing dye (S-2) | $2 \times 10^{-4}$ |
| Sensitizing dye (S-3) | $2 \times 10^{-5}$ |
| Coupler (C-1) | 0.15 |
| Coupler (C-3) | 0.45 |
| Colored coupler (CC-1) | 0.05 |
| DIR coupler (D-2) | 0.10 |
| High boiling solvent (Oil-1) | 0.75 |
| 5th layer: high speed red-sensitive silver halide emulsion layer | |
| Silver bromoiodide (AgI: 6 mol %, octahedron, grain size as converted into cube: 1.0 μm) | 1.8 |
| Gelatin | 1.6 |

-continued

| | |
|---|---|
| Sensitizing dye (S-1) | $1 \times 10^{-4}$ |
| Sensitizing de (S-2) | $1 \times 10^{-4}$ |
| Sensitizing dye (S-3) | $1 \times 10^{-5}$ |
| Coupler (C-2) | 0.10 |
| Coupler (C-1) | 0.20 |
| Colored coupler (CC-1) | 0.02 |
| DIR coupler (D-2) | 0.05 |
| High boiling solvent (Oil-1) | 0.40 |

Sample 15 (invention)

| | |
|---|---|
| 3rd layer: low speed red-sensitive silver halide emulsion layer | |
| Silver bromoiodide (AgI: 7 mol %, octahedron, grain size as converted into cube: 0.3 μm) | 0.9 |
| Gelatin | 1.2 |
| Sensitizing dye (S-1) | $8 \times 10^{-4}$ |
| Sensitizing dye (S-2) | $5 \times 10^{-4}$ |
| Sensitizing dye (S-3) | $3 \times 10^{-5}$ |
| Coupler (C-1) | 0.17 |
| Coupler (C-3) | 0.42 |
| Colored coupler (CC-1) | 0.07 |
| DIR coupler (D-2) | 0.08 |
| High boiling solvent (Oil-1) | 0.75 |
| 4th layer: medium speed red-sensitive silver halide emulsion layer | |
| Silver bromoiodide (AgI: 8 mol %, octahedron, grain size as converted into cube: 0.7 μm) | 0.8 |
| Gelatin | 1.3 |
| Sensitizing dye (S-1) | $3 \times 10^{-4}$ |
| Sensitizing dye (S-2) | $2 \times 10^{-4}$ |
| Sensitizing dye (S-3) | $2 \times 10^{-5}$ |
| Coupler (C-1) | 0.10 |
| Coupler (C-3) | 0.30 |
| Colored coupler (CC-1) | 0.03 |
| DIR coupler (D-2) | 0.07 |
| High boiling solvent (Oil-1) | 0.50 |
| 5th layer: high speed red-sensitive silver halide emulsion layer | |
| Silver bromoiodide (AgI: 6 mol %, octahedron, grain size as converted into cube: 1.0 μm) | 1.8 |
| Gelatin | 1.6 |
| Sensitizing dye (S-1) | $1 \times 10^{-4}$ |
| Sensitizing dye (S-2) | $1 \times 10^{-4}$ |
| Sensitizing dye (S-3) | $1 \times 10^{-5}$ |
| Coupler (C-2) | 0.10 |
| Coupler (C-1) | 0.20 |
| Colored coupler (CC-1) | 0.02 |
| DIR coupler (D-2) | 0.05 |
| High boiling solvent (Oil-1) | 0.40 |

Sample 16 (invention)

| | |
|---|---|
| 3rd layer: low speed red-sensitive silver halide emulsion layer | |
| Silver bromoiodide (AgI: 7 mol %, octahedron, grain size as converted into cube: 0.3 μm) | 1.0 |
| Gelatin | 1.2 |
| Sensitizing dye (S-1) | $8 \times 10^{-4}$ |
| Sensitizing dye (S-2) | $5 \times 10^{-4}$ |
| Sensitizing dye (S-3) | $3 \times 10^{-5}$ |
| Coupler (C-1) | 0.17 |
| Coupler (C-3) | 0.42 |
| Colored coupler (CC-1) | 0.07 |
| DIR coupler (D-2) | 0.08 |
| High boiling solvent (Oil-1) | 0.75 |
| 4th layer: medium speed red-sensitive silver halide emulsion layer | |
| Silver bromoiodide (AgI: 8 mol %, octahedron, grain size as converted into cube: 0.7 μm) | 0.6 |
| Gelatin | 1.3 |
| Sensitizing dye (S-1) | $3 \times 10^{-4}$ |
| Sensitizing dye (S-2) | $2 \times 10^{-4}$ |
| Sensitizing dye (S-3) | $2 \times 10^{-5}$ |
| Coupler (C-1) | 0.12 |
| Coupler (C-3) | 0.36 |
| Colored coupler (CC-1) | 0.04 |
| DIR coupler (D-2) | 0.08 |
| High boiling solvent (Oil-1) | 0.60 |
| 5th layer: high speed red-sensitive silver halide emulsion layer | |

-continued

| | |
|---|---|
| Silver bromoiodide (AgI: 6 mol %, octahedron, grain size as converted into cube: 1.0 μm) | 1.8 |
| Gelatin | 1.6 |
| Sensitizing dye (S-1) | $1 \times 10^{-4}$ |
| Sensitizing dye (S-2) | $1 \times 10^{-4}$ |
| Sensitizing dye (S-3) | $1 \times 10^{-5}$ |
| Coupler (C-2) | 0.10 |
| Coupler (C-1) | 0.20 |
| Colored coupler (CC-1) | 0.02 |
| DIR coupler (D-2) | 0.05 |
| High boiling solvent (Oil-1) | 0.40 |

Sample 17 (invention)

| | |
|---|---|
| 3rd layer: low speed red-sensitive silver halide emulsion layer | |
| Silver bromoiodide (AgI: 7 mol %, octahedron, grain size as converted into cube: 0.3 μm) | 1.0 |
| Gelatin | 1.2 |
| Sensitizing dye (S-1) | $8 \times 10^{-4}$ |
| Sensitizing dye (S-2) | $5 \times 10^{-4}$ |
| Sensitizing dye (S-3) | $3 \times 10^{-5}$ |
| Coupler (C-1) | 0.17 |
| Coupler (C-3) | 0.42 |
| Colored coupler (CC-1) | 0.07 |
| DIR coupler (D-2) | 0.08 |
| High boiling solvent (Oil-1) | 0.75 |
| 4th layer: medium speed red-sensitive silver halide emulsion layer | |
| Silver bromoiodide (AgI: 8 mol %, octahedron, grain size as converted into cube: 0.7 μm) | 0.6 |
| Gelatin | 1.3 |
| Sensitizing dye (S-1) | $3 \times 10^{-4}$ |
| Sensitizing dye (S-2) | $2 \times 10^{-4}$ |
| Sensitizing dye (S-3) | $2 \times 10^{-5}$ |
| Coupler (C-1) | 0.12 |
| Coupler (C-3) | 0.36 |
| Colored coupler (CC-1) | 0.04 |
| DIR coupler (D-2) | 0.08 |
| High boiling solvent (Oil-1) | 0.60 |
| 5th layer: high speed red-sensitive silver halide emulsion layer | |
| Silver bromoiodide (AgI: 6 mol %, octahedron, grain size as converted into cube: 1.0 μm) | 2.2 |
| Gelatin | 2.2 |
| Sensitizing dye (S-1) | $1 \times 10^{-4}$ |
| Sensitizing dye (S-2) | $1 \times 10^{-4}$ |
| Sensitizing dye (S-3) | $1 \times 10^{-5}$ |
| Coupler (C-2) | 0.12 |
| Coupler (C-1) | 0.24 |
| Colored coupler (CC-1) | 0.03 |
| DIR coupler (D-2) | 0.06 |
| High boiling solvent (Oil-1) | 0.49 |

Sample 18 (invention)

| | |
|---|---|
| 3rd layer: low speed red-sensitive silver halide emulsion layer | |
| Silver bromoiodide (AgI: 7 mol %, octahedron, grain size as converted into cube: 0.3 μm) | 1.0 |
| Gelatin | 1.2 |
| Sensitizing dye (S-1) | $8 \times 10^{-4}$ |
| Sensitizing dye (S-2) | $5 \times 10^{-4}$ |
| Sensitizing dye (S-3) | $3 \times 10^{-5}$ |
| Coupler (C-1) | 0.17 |
| Coupler (C-3) | 0.42 |
| Colored coupler (CC-1) | 0.07 |
| DIR coupler (D-2) | 0.08 |
| High boiling solvent (Oil-1) | 0.75 |
| 4th layer: medium speed red-sensitive silver halide emulsion layer | |
| Silver bromoiodide (AgI: 8 mol %, octahedron, grain size as converted into cube: 0.7 μm) | 0.6 |
| Gelatin | 1.3 |
| Sensitizing dye (S-1) | $3 \times 10^{-4}$ |
| Sensitizing dye (S-2) | $2 \times 10^{-4}$ |
| Sensitizing dye (S-3) | $2 \times 10^{-5}$ |
| Coupler (C-1) | 0.12 |
| Coupler (C-3) | 0.36 |
| Colored coupler (CC-1) | 0.04 |

-continued

| | |
|---|---|
| DIR coupler (D-2) | 0.08 |
| High boiling solvent (Oil-1) | 0.60 |
| 5th layer: high speed red-sensitive silver halide emulsion layer | |
| Silver bromoiodide (AgI: 6 mol %, octahedron, grain size as converted into cube: 1.0 μm) | 2.5 |
| Gelatin | 2.5 |
| Sensitizing dye (S-1) | $1 \times 10^{-4}$ |
| Sensitizing dye (S-2) | $1 \times 10^{-4}$ |
| Sensitizing dye (S-3) | $1 \times 10^{-5}$ |
| Coupler (C-2) | 0.14 |
| Coupler (C-1) | 0.28 |
| Colored coupler (CC-1) | 0.03 |
| DIR coupler (D-2) | 0.06 |
| High boiling solvent (Oil-1) | 0.55 |

Sample 19 (invention)

| | |
|---|---|
| 3rd layer: low speed red-sensitive silver halide emulsion layer | |
| Silver bromoiodide (AgI: 7 mol %, octahedron, grain size as converted into cube: 0.3 μm) | 1.0 |
| Gelatin | 1.2 |
| Sensitizing dye (S-1) | $8 \times 10^{-4}$ |
| Sensitizing dye (S-2) | $5 \times 10^{-4}$ |
| Sensitizing dye (S-3) | $3 \times 10^{-5}$ |
| Coupler (C-1) | 0.17 |
| Coupler (C-3) | 0.42 |
| Colored coupler (CC-1) | 0.07 |
| DIR coupler (D-2) | 0.08 |
| High boiling solvent (Oil-1) | 0.75 |
| 4th layer: medium speed red-sensitive silver halide emulsion layer | |
| Silver bromoiodide (AgI: 8 mol %, octahedron, grain size as converted into cube: 0.7 μm) | 0.6 |
| Gelatin | 1.3 |
| Sensitizing dye (S-1) | $3 \times 10^{-4}$ |
| Sensitizing dye (S-2) | $2 \times 10^{-4}$ |
| Sensitizing dye (S-3) | $2 \times 10^{-5}$ |
| Coupler (C-1) | 0.12 |
| Coupler (C-3) | 0.36 |
| Colored coupler (CC-1) | 0.04 |
| DIR coupler (D-2) | 0.08 |
| High boiling solvent (Oil-1) | 0.60 |
| 5th layer: high speed red-sensitive silver halide emulsion layer | |
| Silver bromoiodide (AgI: 6 mol %, octahedron, grain size as converted into cube: 1.0 μm) | 3.0 |
| Gelatin | 3.0 |
| Sensitizing dye (S-1) | $1 \times 10^{-4}$ |
| Sensitizing de (S-2) | $1 \times 10^{-4}$ |
| Sensitizing dye (S-3) | $1 \times 10^{-5}$ |
| Coupler (C-2) | 0.20 |
| Coupler (C-1) | 0.40 |
| Colored coupler (CC-1) | 0.04 |
| DIR coupler (D-2) | 0.10 |
| High boiling solvent (Oil-1) | 0.80 |

Sample 20 (invention)

| | |
|---|---|
| 3rd layer: low speed red-sensitive silver halide emulsion layer | |
| Silver bromoiodide (AgI: 7 mol %, octahedron, grain size as converted into cube: 0.3 μm) | 1.0 |
| Gelatin | 1.2 |
| Sensitizing dye (S-1) | $8 \times 10^{-4}$ |
| Sensitizing dye (S-2) | $5 \times 10^{-4}$ |
| Sensitizing dye (S-3) | $3 \times 10^{-5}$ |
| Coupler (C-1) | 0.70 |
| Coupler (C-3) | 0.42 |
| Colored coupler (CC-1) | 0.07 |
| DIR coupler (D-2) | 0.08 |
| High boiling solvent (Oil-1) | 0.75 |
| 4th layer: medium speed red-sensitive silver halide emulsion layer | |
| Silver bromoiodide (AgI: 8 mol %, octahedron, grain size as converted into cube: 0.7 μm) | 0.6 |
| Gelatin | 1.3 |
| Sensitizing dye (S-1) | $3 \times 10^{-4}$ |
| Sensitizing dye (S-2) | $2 \times 10^{-4}$ |
| Sensitizing dye (S-3) | $2 \times 10^{-5}$ |

-continued

| | |
|---|---|
| Coupler (C-1) | 0.12 |
| Coupler (C-3) | 0.36 |
| Colored coupler (CC-1) | 0.04 |
| DIR coupler (D-2) | 0.08 |
| High boiling solvent (Oil-1) | 0.60 |
| 5th layer: high speed red-sensitive silver halide emulsion layer | |
| Silver bromoiodide (AgI: 6 mol %, octahedron, grain size as converted into cube: 1.0 μm) | 4.0 |
| Gelatin | 3.5 |
| Sensitizing dye (S-1) | $1 \times 10^{-4}$ |
| Sensitizing dye (S-2) | $1 \times 10^{-4}$ |
| Sensitizing dye (S-3) | $1 \times 10^{-5}$ |
| Coupler (C-2) | 0.20 |
| Coupler (C-1) | 0.40 |
| Colored coupler (CC-1) | 0.04 |
| DIR coupler (D-2) | 0.10 |
| High boiling solvent (Oil-1) | 0.80 |

Sample 21 (invention)

| | |
|---|---|
| 3rd layer: low speed red-sensitive silver halide emulsion layer | |
| Silver bromoiodide (AgI: 7 mol %, octahedron, grain size as converted into cube: 0.3 μm) | 1.0 |
| Gelatin | 1.2 |
| Sensitizing dye (S-1) | $8 \times 10^{-4}$ |
| Sensitizing dye (S-2) | $5 \times 10^{-4}$ |
| Sensitizing dye (S-3) | $3 \times 10^{-5}$ |
| Coupler (C-1) | 0.17 |
| Coupler (C-3) | 0.42 |
| Colored coupler (CC-1) | 0.07 |
| DIR coupler (D-2) | 0.08 |
| High boiling solvent (Oil-1) | 0.75 |
| 4th layer: medium speed red-sensitive silver halide emulsion layer | |
| Silver bromoiodide (AgI: 8 mol %, octahedron, grain size as converted into cube: 0.7 μm) | 1.0 |
| Gelatin | 1.3 |
| Sensitizing dye (S-1) | $3 \times 10^{-4}$ |
| Sensitizing dye (S-2) | $2 \times 10^{-4}$ |
| Sensitizing dye (S-3) | $2 \times 10^{-5}$ |
| Coupler (C-1) | 0.12 |
| Coupler (C-3) | 0.36 |
| Colored coupler (CC-1) | 0.04 |
| DIR coupler (D-2) | 0.08 |
| High boiling solvent (Oil-1) | 0.60 |
| 5th layer: high speed red-sensitive silver halide emulsion layer | |
| Silver bromoiodide (AgI: 6 mol %, octahedron, grain size as converted into cube: 1.0 μm | 4.5 |
| Gelatin | 4.5 |
| Sensitizing dye (S-1) | $1 \times 10^{-4}$ |
| Sensitizing dye (S-2) | $1 \times 10^{-4}$ |
| Sensitizing dye (S-3) | $1 \times 10^{-5}$ |
| Coupler (C-2) | 0.20 |
| Coupler (C-1) | 0.40 |
| Colored coupler (CC-1) | 0.04 |
| DIR coupler (D-2) | 0.10 |
| High boiling solvent (Oil-1) | 0.80 |

Samples 12 to 21 prepared as above were subjected to imagewise exposure to white light, followed by color development according to the process [I] in Example 1.

The cyan dye densities yielded by varied exposures were measured on each of the processed samples to obtain a photographic sensitometry curve. Then, the point S defined by the following expression was determined with respect to the density of cyan images, $$S = D\,min + 0.5$$

where Dmin is the minimum density.

At the point S, the density was measured with a microdensitometer having an aperture area of 250 $\mu m^2$ to determine the RMS granularity. Further, after conditioning at 60% RH, each sample was put into a moisture-proof bag and subjected to heat treatment at 40° C.

for 50 days, followed by color development by the process [I]. Then, the difference in minimum cyan density between before and after the heat treatment (Δd) was determined.

Moreover, the samples undergone the imagewise exposure to white light were color-developed according to the following process [II].

| Processing [II] | | |
|---|---|---|
| Color developing | 3 min 15 sec | 38° C. |
| Bleach-fixing | 2 min 00 sec | 38° C. |
| Washing | 1 min 40 sec | 38° C. |
| Fixing | 40 sec | 38° C. |
| (Color developer) | | |
| Diethylenetriamine pentacetate | 1.0 g | |
| 1-hydroxyethylidene-1,1-diphosphonic acid | 2.0 g | |
| Sodium sulfite | 4.0 g | |
| Potassium carbonate | 30.0 g | |
| Potassium bromide | 1.4 g | |
| Potassium iodide | 1.3 mg | |
| Hydroxylamine sulfate | 2.4 g | |
| 4-(N-ethyl-N-β-hydroxyethylamino)-2-methylaniline sulfate | 4.5 g | |
| Water to make | 1 l | |
| | pH 10.00 | |
| (Bleach-fixer) | | |
| Ammonium ferric ethylenediamine tetracetate | 80.0 g | |
| Disodium ethylenediamine tetracetate | 10.0 g | |
| Bleaching accelerator | 1.5 g | |
| Sodium sulfite | 12.0 g | |
| Aqueous solution of ammonium thiosulfate (70%) | 240 ml | |
| Water to make | 1 l | |
| With aqueous ammonia (28%) | pH 6.8 | |
| (Stabilizer) | | |
| Formalin (37% wt) | 2.0 ml | |
| Polyoxyethylene-p-monononylphenolether (average polymerization degree: 10) | 0.3 g | |
| Disodium ethylenediamine tetracetate | 0.05 g | |
| Water to make | 1 l | |
| | pH 6.0 | |

The infrared density (1,000 nm) at the maximum density portion of each processed film was measured to evaluate desilverizing property.

The results are shown in Table 2, which summarizes the evaluation results on the RMS granularity, stability in high temperature storage and infrared absorption density.

TABLE 2

| Sample No. | RMS[1)] | ΔD[2)] | IR Density[3)] |
|---|---|---|---|
| 12 Comparison | 100 | 100 | 20 |
| 13 Comparison | 80 | 200 | 100 |
| 14 Comparison | 75 | 250 | 160 |
| 15 Invention | 60 | 80 | 20 |
| 16 Invention | 60 | 40 | 10 |
| 17 Invention | 55 | 50 | 5 |
| 18 Invention | 50 | 55 | 10 |
| 19 Invention | 75 | 80 | 10 |
| 20 Invention | 80 | 90 | 40 |
| 21 Invention | 105 | 110 | 180 |

[1)]Expressed by a value relative to RMS granularity of Sample 12 which is set at 100 (a smaller value means better granularity).
[2)]Expressed by a value relative to Δd of Sample 12 which is set at 100 (a smaller value means better storage stability).
[3)]Expressed by a value relative to infrared density of Sample 13 which is set at 100 (a smaller value means better desilverizing property).

It can be understood from the results in Table 2 that the samples of the invention are lower in RMS granularity and better in graininess than the samples for comparison and cause less change in the minimum density even after the heat treatment, besides having an excellent desilverizing property in a rapid processing.

What is claimed is:

1. A silver halide color photographic light-sensitive material comprising a support having thereon a red-sensitive silver halide emulsion layer, a green-sensitive silver halide emulsion layer and a blue-sensitive silver halide emulsion layer, wherein said green-sensitive emulsion layer has a three-layered structure, in which a low speed silver halide emulsion layer, medium speed silver halide emulsion layer and high speed silver halide emulsion layer are coated on said support in this order; and the coating amount of silver in the layers increases in the order of the medium speed layer, low speed layer and high speed layer.

2. The photographic material of claim 1, wherein the red-sensitive silver halide emulsion layer and the green-sensitive siler halide emulsion layer each have the layer structure in which the low speed layer, medium speed layer and high speed layer are coated on a support in this order.

3. The photographic material of claim 2, wherein the blue-sensitive silver halide emulsion layer has the layer structure in which the low speed layer, medium speed layer and high speed layer are coated on a support in this order.

4. The photographic material of claim 1, wherein the total coating amount of silver in the photographic material is 2.0 to 10.0 g/m$^2$.

5. The photographic material of claim 4, wherein the total amount of silver is 4.0 to 8.0 g/m$^2$.

* * * * *